(12) United States Patent
Imamura

(10) Patent No.: US 8,425,126 B2
(45) Date of Patent: Apr. 23, 2013

(54) MULTI-CORE OPTICAL FIBER, OPTICAL CONNECTOR AND METHOD OF MANUFACTURING MULTI-CORE OPTICAL FIBER

(75) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 225 days.

(21) Appl. No.: 12/967,738

(22) Filed: Dec. 14, 2010

(65) Prior Publication Data
US 2011/0176776 A1 Jul. 21, 2011

(30) Foreign Application Priority Data
Jan. 15, 2010 (JP) ................... 2010-007480

(51) Int. Cl.
*G02B 6/38* (2006.01)
*G02B 6/036* (2006.01)
*G02B 6/26* (2006.01)
*C03B 37/15* (2006.01)

(52) U.S. Cl.
USPC ............. 385/59; 385/43; 385/123; 385/126; 264/1.25; 65/385; 65/407; 65/408; 65/409; 65/452

(58) Field of Classification Search ............. 385/43, 385/123, 125, 126, 127, 141, 59; 65/385, 65/407, 408, 409, 410, 452; 264/1.25
See application file for complete search history.

(56) References Cited

U.S. PATENT DOCUMENTS

| | | | |
|---|---|---|---|
| 4,076,378 A * | 2/1978 | Cole ........................... | 385/115 |
| 6,249,625 B1 | 6/2001 | Pan | |
| 6,631,234 B1 | 10/2003 | Russell et al. | |
| 7,106,932 B2 * | 9/2006 | Birks et al. .................... | 385/123 |
| 7,274,717 B1 * | 9/2007 | Minden et al. .................... | 372/6 |
| 2004/0105644 A1 * | 6/2004 | Dawes ......................... | 385/129 |
| 2006/0280217 A1 * | 12/2006 | Zervas et al. .................... | 372/72 |
| 2007/0128749 A1 | 6/2007 | Van Eijkelenborg et al. | |
| 2007/0237453 A1 * | 10/2007 | Nielsen et al. .................. | 385/28 |
| 2009/0067793 A1 | 3/2009 | Bennett et al. | |
| 2010/0124397 A1 | 5/2010 | Bennett et al. | |
| 2011/0176776 A1 * | 7/2011 | Imamura ......................... | 385/59 |

FOREIGN PATENT DOCUMENTS

| | | |
|---|---|---|
| JP | 7-168050 | 7/1995 |
| JP | 2008-226886 | 9/2008 |
| JP | 2010-237457 | 10/2010 |
| WO | WO 99/42871 | 8/1999 |

(Continued)

OTHER PUBLICATIONS

Extended European Search Report issued Mar. 31, 2011, in Patent Application No. 11250003.8.

(Continued)

*Primary Examiner* — Brian Healy
(74) *Attorney, Agent, or Firm* — Oblon, Spivak, McClelland, Maier & Neustadt, L.L.P.

(57) ABSTRACT

A multi-core optical fiber which has a plurality of core portions arranged separately from one another in a cross-section perpendicular to a longitudinal direction, and a cladding portion located around the core portions, the multi-core optical fiber comprises a cylindrical portion of which diameter is even, and a reverse-tapered portion gradually expanding toward at least one edge in the longitudinal direction, wherein a gap between each adjacent ones of the core portions in the reverse-tapered portion is greater than that in the cylindrical portion.

14 Claims, 8 Drawing Sheets

FOREIGN PATENT DOCUMENTS

| WO | WO 00/49435 | 8/2000 |
| WO | WO 2005/049517 A1 | 6/2005 |
| WO | WO 2006/100488 A1 | 9/2006 |

OTHER PUBLICATIONS

Ryszard S. Romaniuk, et al., "Multicore optical fiber components", Proceedings of SPIE, vol. 722, XP 198335, Sep. 22, 1986, pp. 117-124.

Masanori Koshiba et al., "Heterogeneous multi-core fibers proposal and design principles," IEICE Electronics Express, vol. 6, No. 2, 2009, pp. 98-103.

Katsunori Imamura et al., "Multi-core holey fibers for the long-distance (>100 km) ultra large capacity transmission," Proceedings of Optical Fiber Communication Conference 2009, OtuC3, 2009, 3 pages.

D.M. Taylor et al., "Demonstration of multi-core photonic crystal fibre in a optical interconnect," Electronic Letters, vol. 42, No. 6, 2006, pp. 331-332.

T.A. Birks, "Reducing losses in photonic crystal fibres," Proceedings of Optical Fiber Communication Conference 2006, OFC7, 2006, 3 pages.

U.S. Appl. No. 13/360,853, filed Jan. 30, 2012, Imamura.

\* cited by examiner

MULTI-CORE OPTICAL FIBER, OPTICAL CONNECTOR AND METHOD OF MANUFACTURING MULTI-CORE OPTICAL FIBER

CROSS-REFERENCE TO RELATED APPLICATIONS

This application is based upon and claims the benefit of priority from the prior Japanese Patent Applications No. 2010-007480, filed on Jan. 15, 2010; the entire contents of which are incorporated herein by reference.

BACKGROUND OF THE DISCLOSURE

1. Field of the Disclosure

The present disclosure relates to a multi-core optical fiber having a plurality of core portions, an optical connector therewith, and a method of manufacturing a multi-core optical fiber.

2. Description of the Related Art

A multi-core optical fiber having a plurality of core portions is assumed to be used for an optical transmission channel which is required to densely house optical fibers in an optical cable and an optical interconnection system in which densely-arranged wirings inside an instrument is required. As the conventional optical fiber, a multi-core optical fiber can be a type that confines light to the core portion by using a refractive index difference between a core portion and a cladding portion which are formed from mediums with refractive indexes different from each other (M. Koshiba, K. Saitoh and Y. Kokubun, "Heterogeneous multi-core fibers proposal and design principle", IEICE Electronics Express, vol. 6, no. 2, pp. 98-103 (2009), a multi-core holey fiber which has a structure in that cladding portions are periodically formed in pores and can use ultrawideband ranging from a visual light range to a near infrared light range as a signal light (K. Imamura, K. Mukasa, Y. Mimura and T. Yagi, "Multi-core holey fibers for the long-distance (>100 km) ultra large capacity transmission", Proceedings of Optical Fiber Communication Conference 2009, OtuC3 (2009)), or the like. In these multi-core optical fiber, each of a plurality of core potions is separated from the other by a gap of 40 μm or 50 μm in a cross-section perpendicular to a longitudinal direction, whereby a dense arrangement of core portions can be realized while crosstalk between the core portions is suppressed.

Moreover, a document "Demonstration of multi-core photonic crystal fiber in an optical interconnect", Electronics Letters, vol. 42, no. 6, pp. 331-332 (2006) by D. M. Taylor, C. R. Bennett, T. J. Shepherd, L. F. Michaille, M. D. Nielsen and H. R. Simonsen, (hereinafter to be referred to as Taylor) discloses a technique of optical transmission with a vertical cavity surface emitting laser (VCSEL) array being used as a signal light source and a multi-core optical fiber being used as an optical transmission channel.

In Taylor, a pitch (gap length) between each adjacent VCSEL elements in the VCSEL array is 62.5 μm. However, fabrication of the VCSEL array in which the VCSEL elements are arranged as closely as such is difficult. In terms of yield rate and fabrication cost, a current realistic pitch of the VCSEL array is about 250 μm. Therefore, when a dense multi-core optical fiber with a pitch between each adjacent two of a plurality of the core portions is being 40 to 50 μm and a realistic VCSEL array being a connection target are to be connected, it is difficult to optically connect each core portion and each VCSEL element.

BRIEF SUMMARY OF THE DISCLOSURE

In accordance with one aspect of the present disclosure, a multi-core optical fiber which has a plurality of core portions arranged separately from one another in a cross-section perpendicular to a longitudinal direction, and a cladding portion located around the core portions, the multi-core optical fiber comprises a cylindrical portion of which diameter is even, and a reverse-tapered portion gradually expanding toward at least one edge in the longitudinal direction, wherein a gap between each adjacent ones of the core portions in the reverse-tapered portion is greater than that in the cylindrical portion.

In accordance with another aspect of the present disclosure, an optical connector comprises a multi-core optical fiber which has a plurality of core portions arranged separately from one another in a cross-section perpendicular to a longitudinal direction, and a cladding portion located around the core portions, the multi-core optical fiber comprising a cylindrical portion of which diameter is constant, and a reverse-tapered portion gradually expanding toward at least one edge in the longitudinal direction which connects to the cylindrical portion, wherein a gap between each adjacent ones of the core portions in the reverse-tapered portion is greater than that in the cylindrical portion.

In accordance with another aspect of the present disclosure, a method of manufacturing a multi-core optical fiber, comprises melting an edge of a preform of the multi-core optical fiber by heating the preform, and when the multi-core optical fiber is drawn from the edge, changing a feed speed of the preform of the multi-core optical fiber and/or a drawing speed of the multi-core optical fiber so that the cylindrical portion and the reverse-tapered portion are to be formed, and cutting the drawn multi-core optical fiber at a predetermined position.

In accordance with another aspect of the present disclosure, a method of manufacturing a multi-core optical fiber, comprises melting an edge of a preform of the multi-core optical fiber by heating the preform, and drawing the multi-core optical fiber from the edge, and after interruption or termination of the drawing, cutting off meniscus formed on the edge of the preform at a predetermined position.

These and other objects, features, aspects, and advantages of the present disclosure will become apparent to those skilled in the art from the following detailed description, which, taken in conjunction with the annexed drawings, discloses preferred embodiments of the present disclosure.

DESCRIPTION OF THE PREFERED EMBODIMENTS

Figure 1:
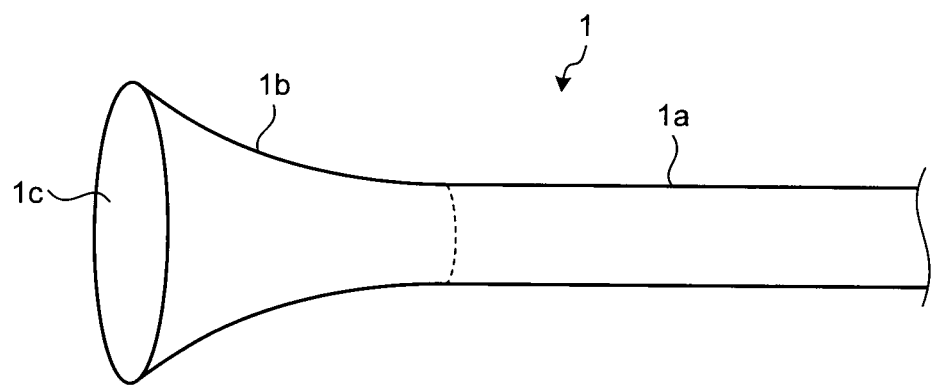
FIG. 1 is a schematic diagram of a multi-core optical fiber according to a first embodiment.

In the following, embodiments of a multi-core optical fiber, an optical connector and a method of manufacturing a multi-core optical fiber according to the present invention will be described in detail with reference to the accompanying drawings. However, the present invention is not limited to the embodiments. In the drawings, for the same or corresponding elements, the same reference numbers will be applied as necessary.

First Embodiment

Firstly, a multi-core optical fiber according to a first embodiment will be described in detail. FIG. 1 is a schematic diagram of the multi-core optical fiber according to the first embodiment. As shown in FIG. 1, the multi-core optical fiber 1 has a cylindrical portion 1a of which external diameter is approximately even along a longitudinal direction, and a reverse-tapered portion 1b juncturally connecting with the cylindrical portion 1a while gradually spreading toward one edge 1c along the longitudinal direction.

Figure 2A:
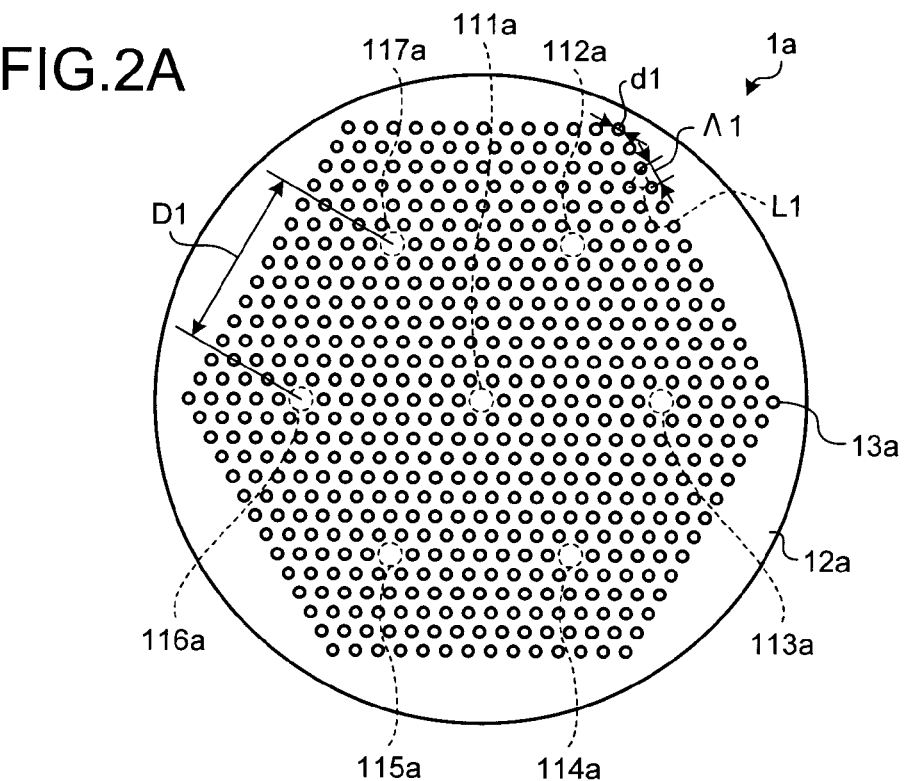
FIG. 2A is a cross-sectional view of a cylindrical portion of the multi-core optical fiber shown in FIG. 1 perpendicular to a longitudinal direction.
Figure 2B:
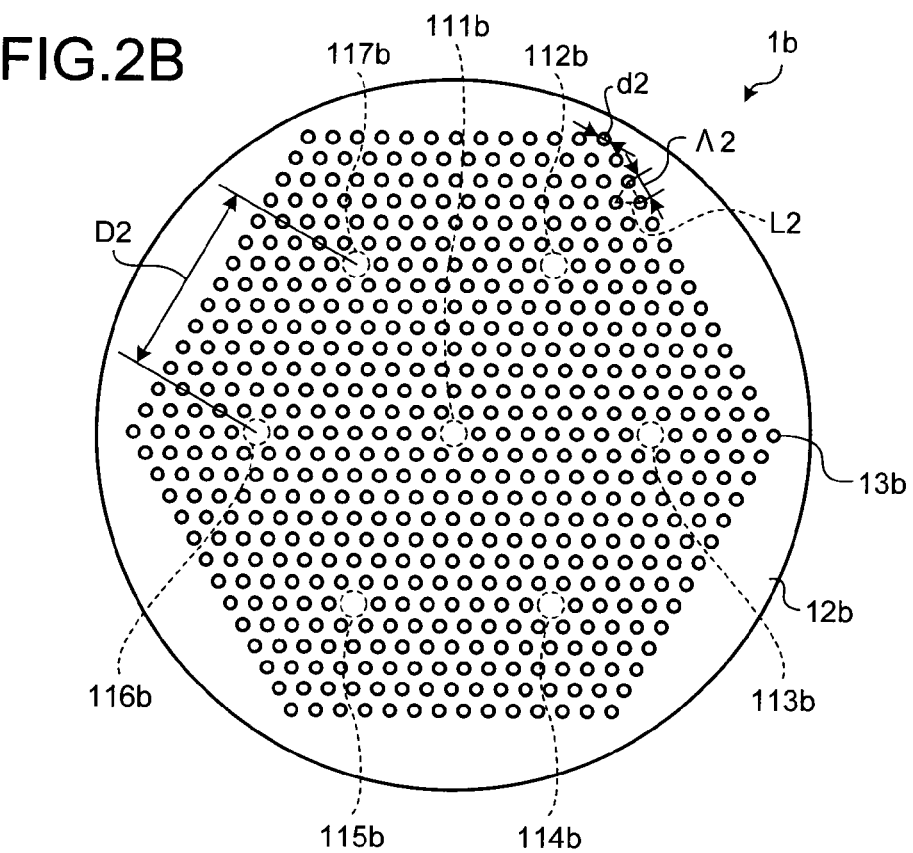
FIG. 2B is a cross-sectional view of a reverse-tapered portion of the multi-core optical fiber shown in FIG. 1 perpendicular to a longitudinal direction.

FIG. 2A is a cross-sectional view of a cylindrical portion 1a of the multi-core optical fiber 1 shown in FIG. 1 showing a cross-section perpendicular to a longitudinal direction. FIG. 2B is a cross-sectional view of a reverse-tapered portion 1b of the multi-core optical fiber 1 shown in FIG. 1 showing a cross-section perpendicular to a longitudinal direction. FIG. 2A shows a cross-section of the cylindrical portion 1a, and FIG. 2B shows a cross-section of the reverse-tapered portion 1b.

As shown in FIG. 2A, the cylindrical portion 1a of the multi-core optical fiber 1 has seven core portions 111a to 117a arranged separately from one another and a cladding portion 12a located around the core portions 111a to 117a. The core portion 111a is located on an approximate center of the cladding portion 12a. The core portions 112a to 117a are located on vertexes of a regular hexagon of which center is the core portion 111a, respectively. The cladding portion 12a has a plurality of pores 13a arranged periodically around the core portions 111a to 117a. A diameter of each of the pores 13a is 'd1'. That is, the multi-core optical fiber 1 is a holey fiber type optical fiber. The pores 13a are arranged so as to form triangle grids L1 each of which grid constant being Λ1. The core portions 111a to 117a and the cladding portion 12a are made of pure quartz glass without dopant for adjusting refraction index, for instance.

A pitch between each adjacent ones among the core portions 111a to 117a is defined based on a gap between centers of the core portions 111a to 117a. In the multi-core optical fiber 1, a gap length between each adjacent core portions is equal. For instance, a gap length between the core portion 116a and the core portion 117a is shown as a gap length D1. The gap length D1 is 40 to 50 μm, for instance.

On the other hand, as shown in FIG. 2B, the reverse-tapered portion 1b of the multi-core optical fiber 1b has core portions 111b to 117b, a cladding portion 12b and pores 13b which are corresponding to the above-described core portions 111a to 117a, the cladding portion 12a and the pores 13a, respectively. The core portions 111b to 117b and the pores 13b homothetically expand along with the expansion of an external diameter of the cladding portion 12b. That is, a diameter d2 of each of the pores 13b, a grid constant Λ2 of each of the triangle grids L2 formed by the pores 13b and a gap length D2 between each adjacent ones among the core portions 111b to 117b also gradually expand toward the edge 1c by approximately the same ratio of the expansion of the cladding portion 12b.

Figure 3:
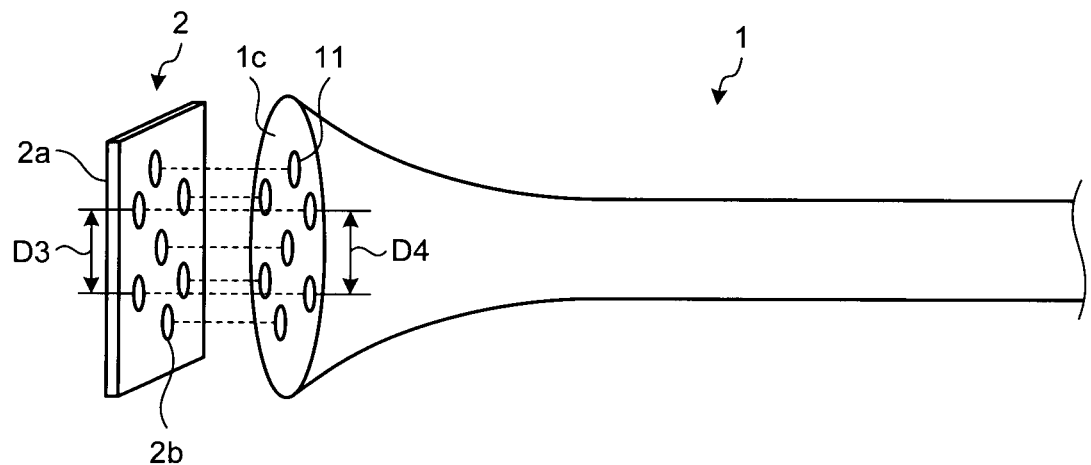
FIG. 3 is an illustration explaining a connection between the multi-core optical fiber shown in FIG. 1 and a VCSEL array.

Next, FIG. 3 is an illustration explaining a connection between the multi-core optical fiber 1 shown in FIG. 1 and a VCSEL array. As shown in FIG. 3, the VCSEL array 2 which is a connection target has a structure in that VCSEL elements 2b are arranged on a common substrate as triangle grids with a gap length D3 between each adjacent ones. The VCSEL array 2 may be used for a signal light source. A value of the gap length D3 is 250 μm, for instance. On the other hand, the multi-core optical fiber 1 is arranged so that the edge 1c faces the VCSEL array 2. In FIG. 3, 11 is the core portion. Between the VCSEL array 2 and the multi-core optical fiber 1, a collimate lens and a collector lens may be arranged in accordance with the number of respective openings as necessary.

Here, in the multi-core expands to the same degree as the gap length D3 between each adjacent ones of the VCSEL elements 2b. Moreover, a positional relation between the multi-core optical fiber 1 and the VCSEL array 2 is adjusted so that each of the VCSEL elements 2b faces each of the core portions 11 which is to be optically coupled with the VCSEL elements 2b. As a result, an optical coupling between each of the VCSEL elements 2b and each of the core portions 11 becomes easy.

In other words, the multi-core optical fiber 1 is arranged so that the core portions 11 in the cylindrical portion 1a are densely arranged in a degree as a gap length D1 between each of the core portions 11 is 40 to 50 μm, for instance. Furthermore, the multi-core optical fiber 1 is arranged so that the gap length D2 in the reverse-tapered portion 1b gradually expands and the gap length D4 at the edge 1c expands to the same degree as the gap length D3 of the VCSEL elements 2b being the connection targets. Thereby, it is possible to densify the core portions and make connecting with the connection target easy. In order to realize densification of the core portions and easiness of connection to the connection targets with balance, it is preferred that the gap length D4 in the edge 1c expands 1.2 to 5 times the gap length D1 in the cylindrical portion 1a.

A length of the cylindrical portion 1a is, for instance, one meter to several dozen kilometers in order to form an optical transmission channel. On the other hand, as for the reverse-tapered portion 1b, it is preferred that a length thereof is shorter as compared to the cylindrical portion 1a in order not to influence optical transmission characteristics of the cylindrical portion 1a.

In the cylindrical portion 1a, when the diameter d1 of each of the pores 13a is d μm and the grid constant Λ1 is Λ, Λ is set based on required transmission characteristics as necessary. It is preferred that Λ is set to 6 μm and d/Λ is set to 0.43 because endlessly single mode (ESM) characteristics can be achieved in an overall wavelength.

At the other edge opposite to the edge 1c in the multi-core optical fiber 1, an expanding portion like the reverse-tapered portion 1b can be formed.

In FIG. 3, the gap length D4 between each adjacent ones of the core portions 11 in the edge 1c expands to the same degree as the gap length D3 between each adjacent ones of the VCSEL elements 2b. However, easiness of optical coupling can be achieved as long as the gap length D4 expands so as to come closer to the gap length D3 as will be described below.

Figure 4:
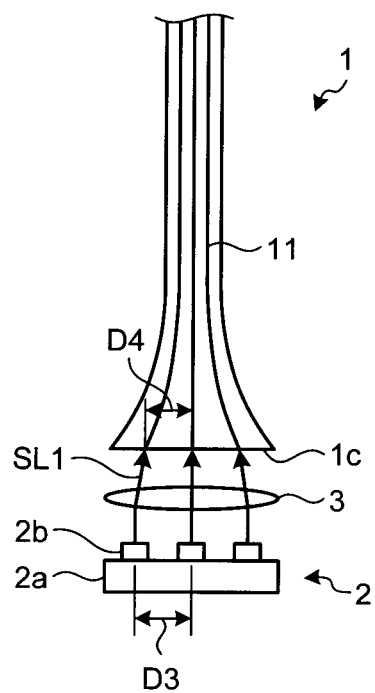
FIG. 4 is an illustration showing an example of a connection between the multi-core optical fiber shown in FIG. 1 and the VCSEL array.

FIG. 4 is an illustration showing an example of a connection between the multi-core optical fiber 1 shown in FIG. 1 and the VCSEL array 2. In the example shown in FIG. 4, the gap length D4 between each adjacent ones of the core portions 11 in the edge 1c of the multi-core optical fiber 1 is shorter than the gap length D3 between each adjacent ones of the VCSEL elements 2b. Therefore, each of optical axes of signal lights SL1 outputted from the VCSEL elements 2b is coupled with each of the core portions 11 by inflecting the optical axes as necessary by using a lens 3. The lens 3 is a single lens or a lens assembly being constructed by assembling a collimate lens and a collective lens. In this example, also because the gap length D4 expands so as to become closer to the gap length D3, the degree of inflection of the optical axes of the signal lights SL1 by the lens 3 is reduced, and thereby, the optical coupling becomes easy.

Figure 5:
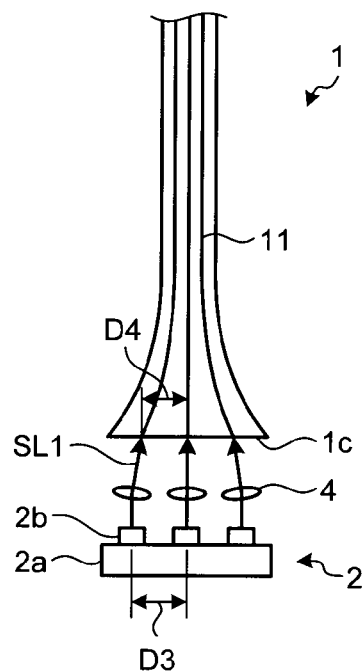
FIG. 5 is an illustration showing another example of the connection between the multi-core optical fiber shown in FIG. 1 and the VCSEL array.

FIG. 5 is an illustration showing another example of the connection between the multi-core optical fiber a shown in FIG. 1 and the VCSEL array 2. In the example shown in FIG. 5, as the example shown in FIG. 4, the gap length D4 of the core portions 11 in the edge 1c of the multi-core optical fiber 1 is shorter than the gap length D3 of the VCSEL elements 2b. Therefore, each of the optical axes of the signal lights SL1 outputted from the VCSEL elements 2b is coupled with each of the core portions 11 by inflecting the axes as necessary by using lenses 4 which are individually arranged for each VXSEL elements 2b. The lenses 4 are arranged aslope according to the degree of infection of the optical axes of the signal lights SL1. In this example, also because the gap length D4 expands so as to become closer to the gap length D3, the degree of inflection of the optical axes of the signal lights SL1 by the lenses 4 is reduced, and thereby, the optical coupling become easy.

Here, in FIGS. 3 to 5, the connection target of the multi-core optical fiber 1 is the VCSEL array 2. However, the connection target is not limited to the VCSEL array while an assembly of arrayed luminous bodies such as LED, or the like, an optical fiber array, and so on, can be applied to the connection target.

Manufacturing Method

Figure 6:
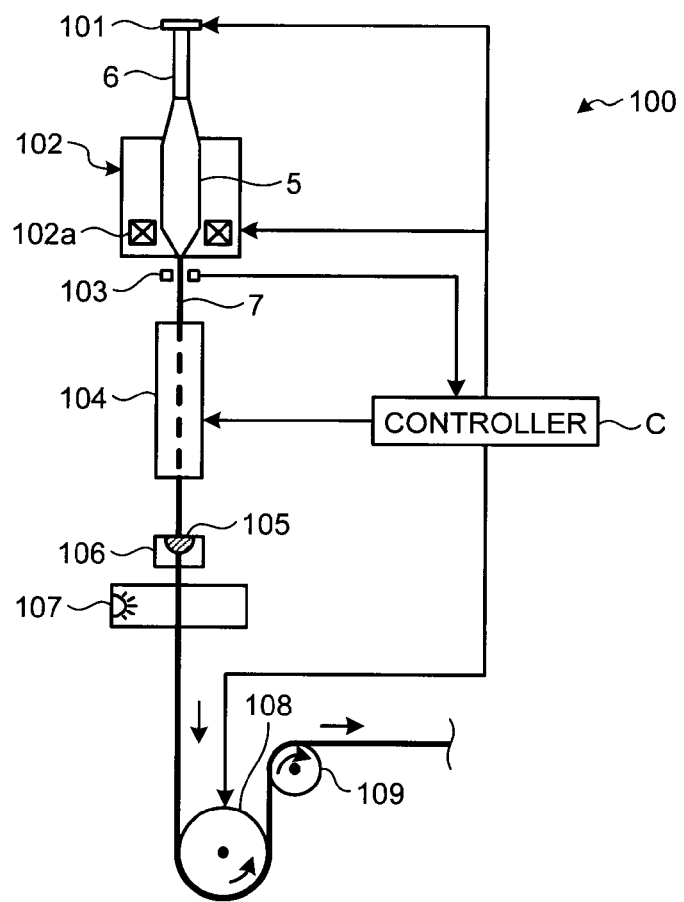
FIG. 6 is an illustration explaining an example of a method of manufacturing the multi-core optical fiber shown in FIG. 1.
Figure 7:
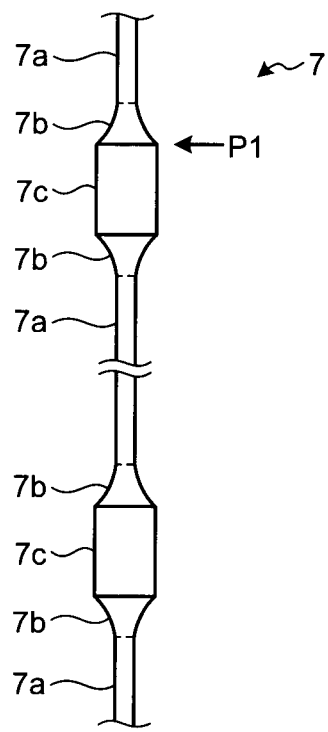
FIG. 7 is an illustration explaining the example of the method of manufacturing the multi-core optical fiber shown in FIG. 1.

Next, a method of manufacturing the multi-core optical fiber 1 shown in FIG. 1 will be described in detail. FIGS. 6 and 7 are illustrations explaining an example of a method of manufacturing the multi-core optical fiber 1 shown in FIG. 1. A manufacturing equipment 100 of optical fiber shown in FIG. 6 has the same structure as a conventional manufacturing equipment of optical fiber. That is, the manufacturing equipment 100 has an elevation mechanism 101 elevating a multi-core optical fiber preform 5 by griping a glass support arm 6 which is welded at a top end of the multi-core optical fiber preform 5, a drawing furnace 102 having a heater 102a and melting an edge of the multi-core optical fiber preform 5 by heating the preform 5, an external diameter gauge 103 gauging an external diameter of a multi-core optical fiber 7 drawn out from the multi-core optical fiber preform 5, a cooling column 104 which is able to cool the multi-core optical fiber 7 by blowing He gas, or the like, to the multi-core optical fiber 7, a die 106 and an UV lamp illumination room 107 arranged on a passage of the multi-core optical fiber 7 and cladding the multi-core optical fiber 7 in a resin 105, a capstan roller 108 being a picking-up mechanism, which is made of a gum elastic, for instance, and a guide rail 109. The manufacturing equipment 100 further has a controller C which fetches in data of the external diameter of the multi-core optical fiber 7 gauged by the external diameter gauge 103 and data of a drawing speed of the multi-core optical fiber 7 calculated from a rotating rate of the capstan roller 108, and controls the elevation mechanism 101, the drawing furnace 102, the cooling column 104 and the capstan roller 108 based on the data of the external diameter and the drawing speed.

In the following, the example of the method of manufacturing the multi-core optical fiber 1 will be described in detail with reference to FIG. 6. Firstly, for instance, the multi-core optical fiber preform 5 is fabricated by using a stacking and drawing technique. In the stacking and drawing technique, silica based solid glass rods which are to become the core portions are placed in a silica based glass tube, silica based void glass capillaries which are provided for forming pores are placed around the glass rods, silica based solid glass rods are filled in interspaces between the glass tube and the glass capillaries, and the glass tube filled with the glass rods and the glass capillaries is drawn.

Next, the multi-core optical fiber preform 5 where the support arm 6 is welded at the top end thereof is placed in the drawing furnace 102, and then, the support arm 6 is griped using the elevation mechanism 101. Then, a leading end of the multi-core optical fiber preform 5 is melted by heating using the heater 102a while the multi-core optical fiber preform 5 is fed downward using the elevation mechanism 101. Thereby, the multi-core optical fiber 7 is drawn out. Then, the external diameter gauge 103 gauges the external diameter of the drawn multi-core optical fiber 7, and transmits a gauged data to the controller C. Then, the cooling column 104 cools down the multi-core optical fiber 7 as necessary. Then, a resin 105 is applied to the multi-core optical fiber 7 using the die 106 at predetermined timing, and the applied resin 105 is hardened at the UV lamp illumination room 107 in order to form a coating. The multi-core optical fiber 7 with the coating being formed is picked up by the capstan roller 108, guided by the guide rail 109 and spooled on a dram by a roll-up mechanism (not shown).

Here, the drawing speed is changed when the multi-core optical fiber 7 is drawn out. By this arrangement, as shown in FIG. 7, the multi-core optical fiber 7 is formed so as to have a repeated structure of a cylindrical portion 7a, diameter variation portions 7b and a cylindrical portion 7c. An external diameter of the cylindrical portion 7a is approximately equal along a longitudinal direction. The diameter variation portions 7b are junctuarlly connected with the cylindrical diameter 7a, external diameters gradually expanding or reduced. An external diameter of the cylindrical portion 7c is approximately equal while being greater than the cylindrical portion 7a. Specifically, by gradually reducing the drawing speed of the multi-core optical portion 7 from a constant drawing speed at formation of the cylindrical portion 7a, the diameter variation portion 7b of which external diameter gradually expands is formed due to consumption of glass becoming smaller with respect to feeding thereof. Then, by changing the drawing speed to become constant, the cylindrical portion 7c is formed, and then, by gradually accelerating the drawing speed, the diameter variation portion 7b with an external diameter being gradually reduced is formed due to consumption of glass becoming greater.

Then, the drawn multi-core optical fiber 7 is cut off at boundary positions P1 between the cylindrical portions 7c and the diameter variation portions 7b. Thereby, the multi-core optical fiber 1 shown in FIG. 1 is manufactured. Here, the cylindrical portions 7a become the cylindrical portions 1a, and the diameter variation portions 7b become the diameter variation portions 7b. According to the above-described method, no special equipment such as a taper equipment having a burner and a spreading mechanism is required, and the multi-core optical fiber 1 can be manufactured by using the conventional manufacturing equipment 100 of optical fiber.

In the above-described method, the drawing speed of the multi-core optical fiber 7 is changed. However, it is also possible to have the multi-core optical fiber 7 with the repeating structure of the cylindrical portions 7a, the diameter variation portions 7b and the cylindrical portions 7c drawn out by changing a feeding speed of the multi-core optical fiber preform 5. In the case where the feeding speed is changed, when the feeding speed is gradually increased, the external diameter of the multi-core optical fiber 7 gradually becomes greater because feeding of glass increases. On the other hand, when the feeding speed is gradually reduced, the external diameter of the multi-core optical fiber gradually becomes smaller. Here, it is possible to change both the drawing speed of the multi-core optical fiber 7 and the feeding speed of the multi-core optical fiber preform 5.

Furthermore, in the above-described method, although the multi-core optical fiber 7c is cut off at the boundary positions E1 between the cylindrical portions 7c and the diameter variation portions 7b, it is also possible to have the multi-core optical fiber 7 cut off at any positions of the cylindrical portions 7c. Moreover, although the cylindrical portions 7c are not essential structures, in view of stable control of the drawing speed, it is preferable that the cylindrical portions 7c are formed after forming the reveres-tapered portions 7b in order to make the drawing speed once constant.

Next, amounts of changes of the drawing speed of the multi-core optical fiber 7 and the feeding speed of the multi-core optical fiber preform 5 will be described in detail.

For instance, in a case of manufacturing the multi-core optical fiber 1 of which gap length D4 is 40 µm in the cylindrical portion 1a and 125 µm in the edge 1c, the gap length needs to be increased by approximately three times. In the case where the external diameter of the cylindrical portion 1c is set to 125 µm, in order to triple the gap length by the change in the drawing speed of the multi-core optical fiber 7 when the diameter of the multi-core optical fiber preform 5 is 20 mm and the feeding speed of the multi-core optical fiber preform 5 is kept at 0.25 mm/min, the drawing speed may be changed to 0.65 m/min from 6.4 m/min.

On the other hand, in order to triple the gap length by the change in the feeding speed of the multi-core optical fiber preform 5 when the drawing speed of the multi-core optical fiber 7 is kept at 0.5 m/min, the feeding speed may be changed to 0.2 mm/min from 0.02 mm/min.

Furthermore, for instance, in a case of manufacturing the multi-core optical fiber 1 of which gap length D4 is 50 µm in the cylindrical portion 1a and 250 µm in the edge 1c, the gap length needs to be increased by five times. In the case where the external diameter of the cylindrical portion 1c is set to 250 µm, in order to increase the gap length by five times by change in the drawing speed of the multi-core optical fiber 7 when the diameter of the multi-core optical fiber preform 5 is 40 mm and the feeding speed of the multi-core optical fiber preform 5 is kept at 0.1 mm/min, the drawing speed may be changed to 0.20 m/min from 4.9 m/min.

On the other hand, in order to increase the gap length by five times by the change in the feeding speed of the multi-core optical fiber preform 5 when the drawing speed of the multi-core optical fiber 7 is kept at 5 m/min, the feeding speed may be changed to 2.5 mm/min from 0.1 mm/min.

The above-described control is executed by the controller C. Specifically, the drawing speed is controlled by the controller C increasing or decreasing the rotating rate of the capstan roller 108, the feeding speed is controlled by the controller C increasing or decreasing an elevation speed of the elevation mechanism 101, and the external diameter of the multi-core optical fiber 7 is controlled by the controller C controlling the elevation mechanism 101 and the capstan roller 108 based on data from the external diameter gauge 103.

Considering a realistic elevation speed of the elevation mechanism 101, it is preferred that the feeding speed of the multi-core optical fiber preform 5 is changed within a range of 0.01 mm/min to 10 mm/min. Furthermore, it is preferred that the drawing speed of the multi-core optical fiber 7 is changed within a range of the 0.1 m/min to 10 m/min. The drawing speed equal to or greater than 0.1 m/min is desirable in terms of control accuracy of the capstan roller 108, and the drawing speed equal to or less than 10 m/min is an appropriate drawing speed for enabling desired variation in the external diameter while the multi-core optical fiber 7 is drawn by a few meters.

Figure 8:
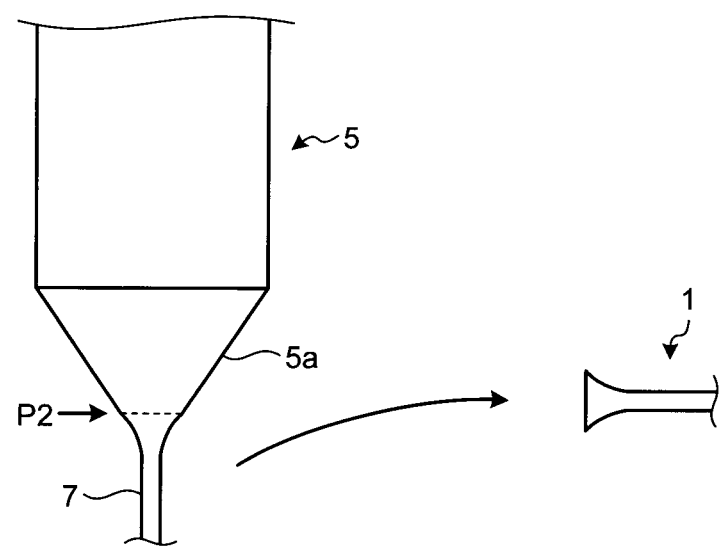
FIG. 8 is an illustration explaining another example of the method of manufacturing the multi-core optical fiber shown in FIG. 1.

Next, another example of the method of manufacturing the multi-core optical fiber 1 shown in FIG. 1 will be described in detail. FIG. 8 is an illustration explaining another example of the method of manufacturing the multi-core optical fiber shown in FIG. 1. When the multi-core optical fiber 7 is drawn out from the multi-core optical fiber preform 5 using the above-described method, as shown in FIG. 8, a meniscus 5a having the external diameter gradually reducing due to being molten is formed at one end of the multi-core optical fiber preform 5, and the multi-core optical fiber 7 is drawn out from a lower portion of the meniscus 5a.

When the drawing is interrupted or finished under such condition, the meniscus 5a is hardened while keeping nearly the same shape at that point. After being hardened, the meniscus 5a is cut off at a predetermined position P2. Accordingly, around the cut-off portion, the lower portion of the meniscus 5a becomes the reverse-tapered portion, and the multi-core optical fiber 7 becomes the cylindrical portion, and thereby the multi-core optical fiber 1 is manufactured.

When the multi-core optical fiber 1 is manufactured using any one of the two methods described above as the examples, a mode field radius of each of the core potions also expand in the reverse-tapered portion of the multi-core optical fiber 1. Accordingly, if the reverse-tapered portion is too long, optical interference may occur between lights respectively propagating each of the core portions. This may influence optical transmission characteristics. However it, the length of the reverse-tapered portion is equal to or less than 10 m, the influence of the interference may not be such a big problem.

Second Embodiment

The multi-core optical fiber 1 according to the first embodiment is a holey fiber type optical fiber. Although, it can also be a multi-core optical fiber with a type of confining light to the core portion by using a refractive index difference between a core portion and a cladding portion which are formed by mediums with refractive indexes different from each other. In the following, a multi-core optical fiber confining light to the core portion using a refractive index difference will be described in detail. The multi-core optical fiber according to the second embodiment has a cylindrical portion and a reverse-tapered portion as the multi-core optical fiber 1 shown in FIG. 1.

Figure 9:
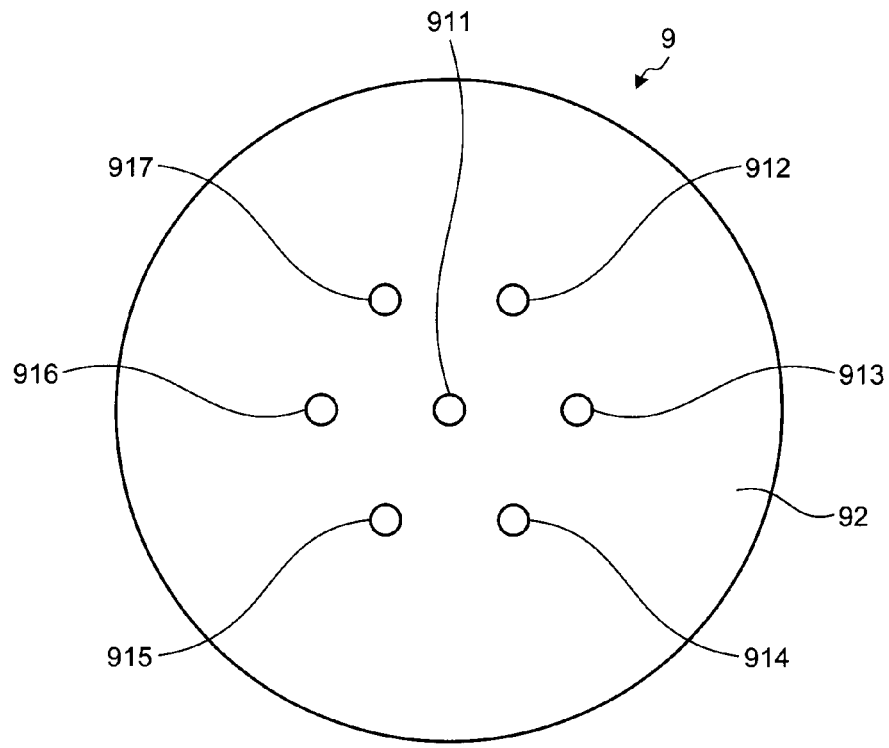
FIG. 9 is a schematic diagram of an edge surface of a multi-core optical fiber according to a second embodiment.

FIG. 9 is a schematic diagram of an edge surface of a multi-core optical fiber according to the second embodiment. As shown in FIG. 9, the multi-core optical fiber 9 has core portions 911 to 917 arranged so as to be separated from each other and a cladding portion 92 located around the core portions 911 to 917. The core portion 911 is located on an approximate center of the cladding portion 92. The core portions 912 to 917 are located on vertexes of a regular hexagon of which center is the core portion 911, respectively. A gap length between each of the core portions 912 to 917 and core diameters of the core portions 911 to 917 can be changed as necessary. As an example, the gap length can be about 60 μm, and the core diameter is about 5.0 to 10.0 μm, for instance. Each of the core portions 911 to 917 is made of germanium doped silica based glass, and the cladding portion 92 is made of pure silica based glass. By this arrangement, the cladding portion 92 has a refractive index lower than that of each of the core portions 911 to 917, and a relative refractive index difference of each of the core portions 911 to 917 with respect to the cladding portion 92 is around 0.3 to 1.5%. The multi-core optical fiber 9 confines light to each of the core potions 911 to 917 using the refractive index difference, and the light propagates inside each of the core portions 911 to 917.

Moreover, the multi-core optical fiber 9 is also arranged so that the core portions in the cylindrical portion are densely arranged, a gap length in the reverse-tapered portion gradually expands, and a gap length at an edge expands to the same degree as a gap length between each of VCSEL elements being the connection targets. Thereby, it is possible to densify the core portions and make connection with the connection target easy.

Third Embodiment

Figure 10:
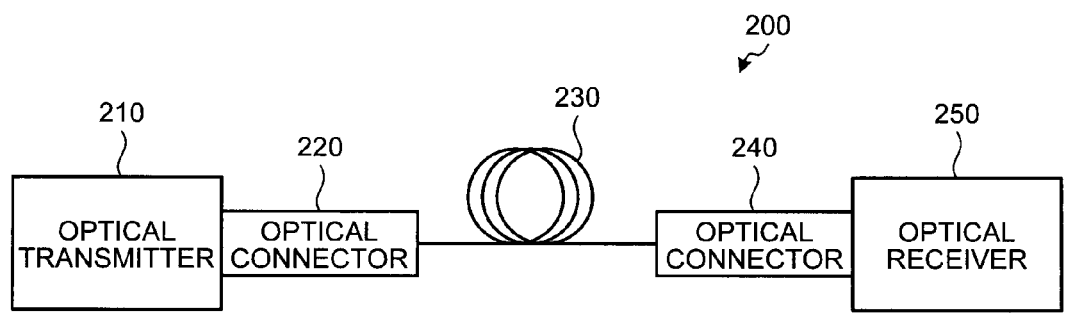
FIG. 10 is a block diagram showing a structure of an optical communication system using an optical connector according to a third embodiment.

Next, an optical connector having the multi-core optical fiber 1 according to the first embodiment will be described as a third embodiment of the present invention. FIG. 10 is a block diagram showing a structure of an optical communication system using an optical connector according to a third embodiment. As shown in FIG. 10, the optical communication system 200 has an optical transmitter 210 which outputs a signal light, an optical transmission channel 230 which transmits the signal light outputted from the optical transmitter 210, and an optical receiver 250 which receives the signal light transmitted via the optical transmission channel 230 and processes the signal light. Between the optical transmitter 210 and the optical transmission channel 230 and between the optical transmission channel 230 and the optical receiver 250, optical connectors 220 and 240 according to the third embodiment are arranged, respectively, for connection between the two.

The optical transmitter 210 is constructed from a VCSEL array, and so forth, and has signal light sources each of which outputs a signal light different from the other. The optical transmission channel 230 is a multi-core optical fiber having seven core portions each of which has the same structure as the cylindrical portion 1a of the multi-core optical fiber 1 shown in FIG. 1. The core portions are densely arranged to a degree that a gap length between each of the core portions is 50 μm. The optical connector 220 optically couples the signal lights outputted from the optical transmitter 210 to the seven core portions of the optical transmission channel 230, respectively. The optical transmission channel 230 transmits the coupled signal lights.

The optical receiver 250 has seven light receiving elements which receive the signal lights transmitted via the optical transmission channel 230 and convert the received signal lights to electrical signals, and a signal processor processing the electrical signals converted by the light receiving elements. The optical connector 240 optically couples the signal lights transmitted via the optical transmission channel 230 to the light receiving elements of the optical receiver 250, respectively.

Figure 11:
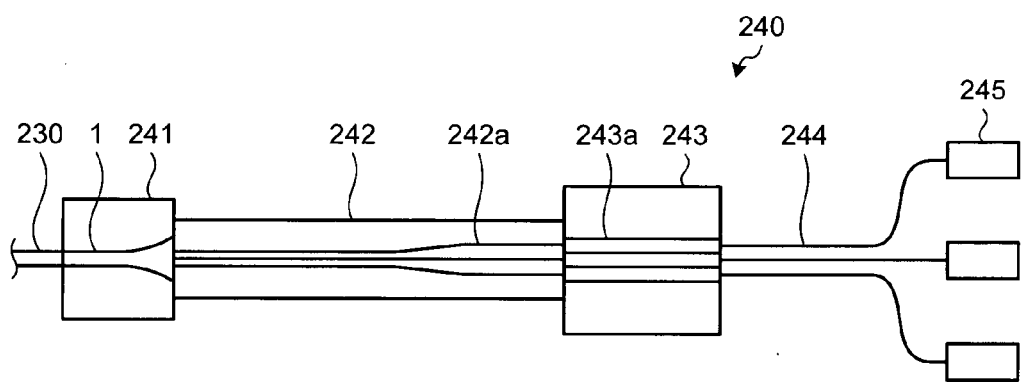
FIG. 11 is a schematic diagram of the optical connector according to the third embodiment.

Next, the optical connector 240 according to the third embodiment will be described in detail. In the following, the optical connector 220 has the same structure as the optical connector 240, and therefore, redundant explanations of the optical connector 220 will be omitted. FIG. 11 is a schematic diagram of the optical connector 240 according to the third embodiment. As shown in FIG. 11, the optical connector 240 has a structure in that the multi-core optical fiber 1 according to the first embodiment, a holding member 241, a planar lightwave circuit (PLC) 242, a holding member 243, three optical fiber cords 244 and three ferrules 245 are connected in this order. The multi-core optical fiber 1 is connected to the optical transmission channel 230. The holding member 241 is made of glass, or the like, and holds the multi-core optical fiber 1. The PLC 242 has three light waveguides 242a. The holding member 243 is made of glass, or the like, and holds three optical fiber arrays 243a. In FIG. 11, on both sides of the PLC 242 and the holding member 243 in a direction perpendicular to the paper, other PLCs and holding members holding optical fiber arrays are stacked. To the optical fibers, optical fiber cords and ferrules are further connected.

A gap length between each of the core portions of the multi-core optical fiber 1 is 50 μm at the cylindrical portion and 80 μm at an edge of the reverse-tapered portion connected to the PLC 242. Here, the external diameter of each of the optical fiber constructing the optical fiber array 243a is 125 μm, and therefore, a gap length between each of the core portions of each of the optical fibers is 125 μm. A gap length between each of the three light waveguides 242a in the PLC 242 is 80 μm at a side of the multi-core optical fiber 1. The three light waveguides 242a are connected to line-arranged three core portions (the core portions 116b, 111b and 113b in FIG. 2) of the multi-core optical fiber 1, respectively. The gap length of the light waveguides 242a is changed into 125 μm on a side of the optical fiber array 243a. On the side of the optical fiber array 243a, the light waveguides 242a are connected to the core portions of each of the optical fibers constructing the optical fiber array 243a.

In the optical transmission channels 230, the signal lights transmitted via the three core portions connected to the line-arranged three core portions of the multi-core optical fiber 1 are inputted to the optical receiver 250 after propagating the multi-core optical fiber 1, the PLC 242, the optical fiber array 243a, the optical fiber cords 244 and the ferrules 245 sequentially. Between the optical transmission channel 230 and the optical fiber array 243a, the gap length gradually expands between the channels of the signal lights by the multi-core optical fiber 1 and the PLC 242. As a result, the optical transmission channel 230 and the optical fiber array 243a can be connected to each other with low optical loss. Especially, in the optical connector 240, the multi-core optical fiber 1 of which gap length between the core portions at the reverse-tapered portion gradually increases is located between the optical transmission channel 230 and the PLC 242. By this arrangement, because the gap length between the light waveguides 242a of the PLC 242 becomes greater than in a case where the optical transmission channel 230 and the PLC 242 are directly connected to each other, an easily manufacturable PLC 242 can be used, and also connecting between them can become easy. When the multi-core optical fiber 1 is manufactured by the above-described manufacturing method, a mode field radius of each of the core portions in the reverse-tapered portion of the multi-core optical fiber 1 is also increasing. This is preferable because tolerance of optical axes of the multi-core optical fiber 1 and the PLC 242 becomes greater.

In the optical transmission, the signal light transmitted via the other four core portions are inputted to the optical receiver 250 after propagating through holding members holding the optical fiber arrays each of which is constructed from another PLC having two light waveguides and two optical fibers, the optical fiber arrays being stacked on both sides of the PLC 242 and the holding member 243, and optical fiber cords and ferrules which are connected to the optical fiber array.

Here, in the third embodiment, it is not necessity that all of the core portions of the optical transmission channel 230 are used for signal light transmission. For instance, in the optical transmission channel 230, only three core portions connected to the line-arranged core portions of the multi-core optical fiber 1 are used for the signal light transmission. Furthermore, the optical transmission channel 230 can be replaced with a multi-core optical fiber which has only three line-arranged core portions as core portions. In this case, it is not necessary that the PLC, and so forth, are stacked on both sides of the PLC 242 and the holding member 243 as described above.

Fourth Embodiment

Figure 12:
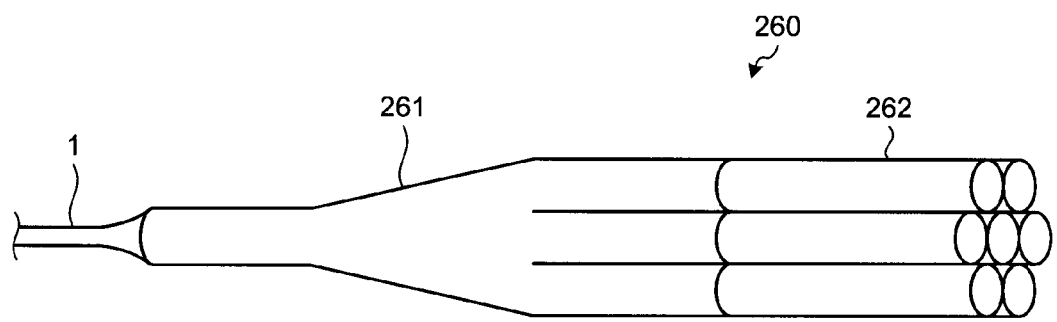
FIG. 12 is a schematic diagram of an optical connector according to a fourth embodiment.

Next, an optical connector according to a fourth embodiment of the present invention will be described in detail. FIG. 12 is a schematic diagram of an optical connector according to the fourth embodiment. As shown in FIG. 12, the optical connector 260 has a structure in that the multi-core optical fiber 1 according to the first embodiment 1, an optical fiber bundle 261, bundled optical fibers 262, optical fiber cords (not shown) and ferrules (not shown) are connected in this order. The optical connector 260 can be used in place of the optical connector 240 shown in FIGS. 10 and 11, for instance.

A gap length between each of the core portions of the multi-core optical fiber 1 is 50 µm at the cylindrical portion and 80 µm at an edge of the reverse-tapered portion connected to the optical fiber bundle 261. One edge of the optical fiber bundle 261 has a structure in that seven single-mode optical fibers of which external diameters are 125 µm are bundled, and the other edge has a structure in that an external diameter reduces after the optical fibers converges. In the other edge of the optical fiber bundle 261, the core portions are located on vertexes and a center of a regular hexagon as in a way similar to the multi-core optical fiber 9 shown in FIG. 9, a gap length between the core portions being 80 µm (see Japanese patent application Laid-Open No. 2008-226886, for instance).

In this optical connector 260 also, the multi-core optical fiber 1 of which pitch between the core portions in the reverse-tapered portion is gradually increasing is connected to the optical fiber bundle 261. By this arrangement, because the gap length between the core portions in the optical fiber bundle 261 becomes greater than in the case, for instance, where the optical transmission channel 230 shown in FIG. 10 and the optical fiber bundle 261 are directly connected to each other, an easily manufacturable one can be used for the optical fiber bundle 261 while connection thereto can become easy.

Fifth Embodiment

Figure 13:
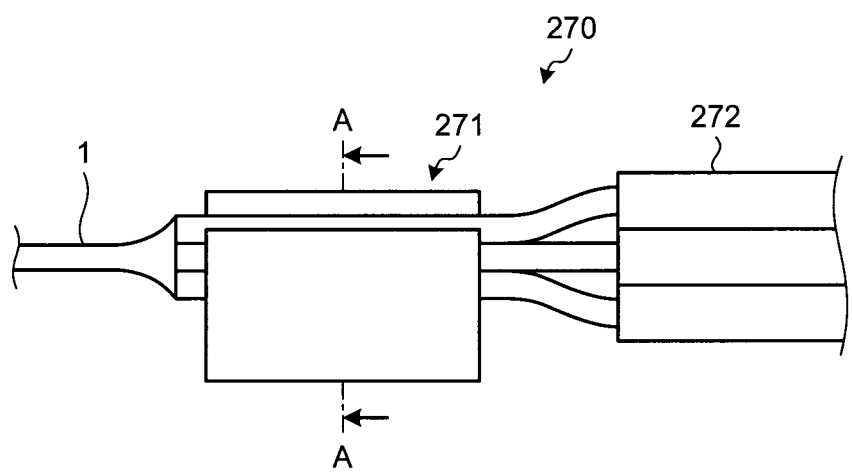
FIG. 13 is a schematic diagram of an optical connector according to a fifth embodiment.
Figure 14:
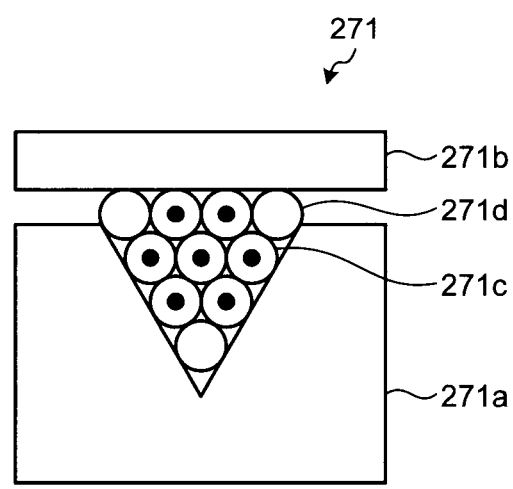
FIG. 14 is an A-A cross-section view of the optical connector shown in FIG. 13.

Next, an optical connector according to a fifth embodiment of the present invention will be described in detail. FIG. 13 is a schematic diagram of an optical connector according to the fifth embodiment. FIG. 14 is a cross-section view of the optical connector shown in FIG. 13 takes along a line A-A. As shown in FIG. 13, the optical connector 270 has a structure in that the multi-core optical fiber 1 according to the first embodiment 1, an optical fiber bundle 271, bundled optical fibers 272, optical fiber cords (not shown) and ferrules (not shown) are connected in this order. The optical connector 270 can be used in place of the optical connector 240 shown in FIGS. 10 and 11, for instance.

As shown in FIG. 14, the optical fiber bundle 271 is constructed from a V-shaped trench jig 271a, seven optical fibers 271c each of which external diameter is 80 µm, and three dummy fibers 271d without any core portions although if the external diameter thereof is 80 µm like the optical fiber 271c. The optical fibers 271c are assembled in a way that they are located on vertexes and a center of a regular hexagon, and the optical fibers 271c are housed in the V-shaped trench jig 271a in such state. The dummy fibers 271d are housed in the V-shaped trench jig 271a so as to fill gaps of the V-shaped trench jig 271a. Both the optical fibers 271c and the dummy fibers 271d are pinned by a pinning plate 271b. The dummy fibers 271d and the V-shaped trench jig 271a are in the approximately same length. The optical fibers 271c stick out from the V-shaped trench jig 271a. One end of each of the optical fibers 271c is connected to the multi-core optical fiber 1 while the other end is connected to the optical fiber 272.

In the optical connector 270 also, the multi-core optical fiber 1 of which pitch between the core portions in the reverse-tapered portion is gradually increasing is connected to the optical fiber bundle 271. By this arrangement, it is possible to use easily usable optical fibers of which external diameters are large as the optical fibers 271c while also connection between them can become easy.

According to the above-described embodiments, because the gap length between the core portions is increasing, easy optical connection with the connection target can be achieved.

In addition, in the above-described embodiments, although the gap lengths between the core portions of the multi-core optical fiber are equal, the gap lengths does not necessarily has to be equal. Furthermore, the alignment of the core portions in the multi-core optical fiber is not limited to the triangle grid state. A liner state, a square grid state, or the like, can be applied, for instance. Moreover, the number of the core portions of the multi-core optical fiber is not particularly confined.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. A multi-core optical fiber which has a plurality of core portions arranged separately from one another in a cross-section perpendicular to a longitudinal direction, and a cladding portion located around the core portions, the multi-core optical fiber comprising:

a cylindrical portion of which diameter is constant; and a reverse-tapered portion gradually expanding toward at least one edge in the longitudinal direction which connects to the cylindrical portion, wherein a gap between each adjacent ones of the core portions in the reverse-tapered portion is greater than that in the cylindrical portion, each core portion is to be optically connected to each of a plurality of connection targets which are arranged separately from one another, and the gap between each adjacent ones of the core portions expands so as to come closer to a gap between each adjacent ones of the connection targets.

2. The multi-core optical fiber according to claim 1, wherein the connection targets are luminous bodies or optical fibers.

3. A multi-core optical fiber which has a plurality of core portions arranged separately from one another in a cross-section perpendicular to a longitudinal direction, and a cladding portion located around the core portions, the multi-core optical fiber comprising:

a cylindrical portion of which diameter is constant; and a reverse-tapered portion gradually expanding toward at least one edge in the longitudinal direction which connects to the cylindrical portion, wherein a gap between each adjacent ones of the core portions in the reverse-tapered portion is greater than that in the cylindrical portion, the gap between each adjacent ones of the core portions at the edge of the reverse-tapered portion is 1.2 to 5 times greater than that in the cylindrical portion.

4. The multi-core optical fiber according to claim 1, wherein the gap between each adjacent ones of the core portions at the edge of the reverse-tapered portion is 1.2 to 5 times greater than that in the cylindrical portion.

5. The multi-core optical fiber according to claim 2, wherein the gap between each adjacent ones of the core portions at the edge of the reverse-tapered portion is 1.2 to 5 times greater than that in the cylindrical portion.

6. A method of manufacturing a multi-core optical fiber which has a plurality of core portions arranged separately from one another in a cross-section perpendicular to a longitudinal direction, and a cladding portion located around the core portions, the multi-core optical fiber comprising a cylindrical portion of which diameter is constant; and a reverse-tapered portion gradually expanding toward at least one edge in the longitudinal direction which connects to the cylindrical portion, wherein a gap between each adjacent ones of the core portions in the reverse-tapered portion is greater than that in the cylindrical portion, the method comprising:

melting an edge of a preform of the multi-core optical fiber by heating the preform, and when the multi-core optical fiber is drawn from the edge, changing a feed speed of the preform of the multi-core optical fiber and/or a drawing speed of the multi-core optical fiber so that the cylindrical portion and the reverse-tapered portion are to be formed; and cutting the drawn multi-core optical fiber at a predetermined position.

7. The method of manufacturing the multi-core optical fiber according to claim 6, wherein the feed speed of the preform of the multi-core optical fiber is changed within a range of 0.01 to 10 mm/minute.

8. The method of manufacturing the multi-core optical fiber according to claim 6, wherein the drawing speed of the multi-core optical fiber is changed within a range of 0.1 to 10 m/minute.

9. A method of manufacturing a multi-core optical fiber which has a plurality of core portions arranged separately from one another in a cross-section perpendicular to a longitudinal direction, and a cladding portion located around the core portions, the multi-core optical fiber comprising a cylindrical portion of which diameter is constant; and a reverse-tapered portion gradually expanding toward at least one edge in the longitudinal direction which connects to the cylindrical portion, wherein a gap between each adjacent ones of the core portions in the reverse-tapered portion is greater than that in the cylindrical portion, the method comprising:

melting an edge of a preform of the multi-core optical fiber by heating the preform, and drawing the multi-core optical fiber from the edge; and after interruption or termination of the drawing, cutting off meniscus formed on the edge of the preform at a predetermined position.

10. An optical connector comprising a multi-core optical fiber according to claim 1.

11. The optical connector according to claim 10, wherein the connection targets are luminous bodies or optical fibers.

12. An optical connector comprising a multi-core optical fiber according to claim 3.

13. The optical connector according to claim 10, wherein the gap between each adjacent ones of the core portions at the edge of the reverse-tapered portion is 1.2 to 5 times greater than that in the cylindrical portion.

14. The optical connector according to claim 11, wherein the gap between each adjacent ones of the core portions at the edge of the reverse-tapered portion is 1.2 to 5 times greater than that in the cylindrical portion.

* * * * *